(12) United States Patent
Volkenandt et al.

(10) Patent No.: US 6,977,776 B2
(45) Date of Patent: Dec. 20, 2005

(54) HEAD-MOUNTED OPTICAL DIRECT VISUALIZATION SYSTEM

(75) Inventors: Harald Volkenandt, Aalen (DE); Uwe Frey, Böbingen (DE); Thomas Alt, Braunschweig (DE); Werner Schreiber, Meine (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 10/750,958

(22) Filed: Jan. 5, 2004

(65) Prior Publication Data

US 2005/0083579 A1 Apr. 21, 2005

Related U.S. Application Data

(63) Continuation of application No. PCT/EP02/06482, filed on Jun. 13, 2002.

(30) Foreign Application Priority Data

Jul. 6, 2001 (DE) .................. 101 32 872

(51) Int. Cl.⁷ .......................... G02B 27/14; G09G 5/00
(52) U.S. Cl. ............................. 359/630; 345/8
(58) Field of Search ................. 345/7, 8, 9, 13; 359/630, 631, 632

(56) References Cited

U.S. PATENT DOCUMENTS

| | | | |
|---|---|---|---|
| 5,333,029 A | 7/1994 | Uchiyama et al. | 396/51 |
| 5,610,678 A | 3/1997 | Tsuboi et al. | 396/373 |
| 5,886,822 A | 3/1999 | Spitzer | 359/630 |
| 5,991,085 A | 11/1999 | Rallison et al. | 359/630 |
| 6,034,653 A | 3/2000 | Robertson et al. | 345/8 |
| 6,201,646 B1 | 3/2001 | Togino et al. | 359/629 |
| 6,215,460 B1 * | 4/2001 | Mizoguchi et al. | 345/8 |

FOREIGN PATENT DOCUMENTS

EP  0 592 318  4/1994  .......... G02B 27/00

* cited by examiner

Primary Examiner—David N. Spector
(74) Attorney, Agent, or Firm—Walter Ottesen

(57) ABSTRACT

A head-mounted optical direct visualization system has at least one optical deflecting device (120) with an optical end element (128) for deflecting a virtual image generated by an image source (230) onto the optical end element (128). The virtual image is emitted through the optical end element into the field of view in front of the eyes of the user. The optical deflecting device (120) is attached to the head of the user with the aid of a frame (130). The task of the invention is to configure such a conventional direct visualization system so as to be better adaptable to the requirements of the anatomical and optical features of the user and the application-specific viewing requirements. This task is solved with an adjusting device (140), which is fixed to the frame (130), for variably changing the position of at least the optical end element (128) essentially in a plane parallel to the field of view of the user.

25 Claims, 1 Drawing Sheet

HEAD-MOUNTED OPTICAL DIRECT VISUALIZATION SYSTEM

RELATED APPLICATIONS

This application is a continuation application of international patent application PCT/EP 02/06482, filed Jun. 13, 2002, and claiming priority from German patent application 101 32 872.9, filed Jul. 6, 2001. International application PCT/EP 02/06482 and German patent application 101 32 872.9 are both incorporated herein by reference.

FIELD OF THE INVENTION

The invention relates to a head-mounted optical direct visualization system (head-mounted display (HMD)).

Accordingly, a head-mounted direct visualization system includes at least one optical deflecting device 210 which, with the aid of a frame 220, is mounted on the head of a user (see FIG. 2). A head-mounted direct visualization system is known from the state of the art, especially from U.S. Pat. No. 5,886,822. The optical deflecting device 210 includes an optical end element 215 and functions to deflect a virtual image, which is generated by an image source 230, to the optical end element 215. The virtual image is outputted via the optical end element in the viewing field of the user forward of the user's eyes.

A known head-mounted direct visualization system of this kind has, however, the disadvantage that it is not very user friendly or application friendly.

SUMMARY OF THE INVENTION

Starting from this state of the art, it is therefore an object of the invention to improve a known head-mounted optical direct visualization system in such a manner that it is adaptable with respect to the anatomical and optical characteristics of the user as well as adaptable with respect to an instantaneous task-required primary viewing direction of the user.

The head-mounted optical visualization system of the invention is for a user and includes: an image source for generating a virtual image; an optical deflecting device including an optical end element; the optical deflecting device being optically connected to the image source for receiving the virtual image and for deflecting the virtual image to the optical end element whereby the virtual image is provided in the viewing field of the user in front of the eyes of the user; a frame mountable on the head of the user for carrying the optical deflecting system; and, an adjusting device attached to the frame for variably changing the position of the optical end element substantially in a plane parallel to the viewing field of the user.

Therefore, a head-mounted optical direct visualization system includes an adjusting system attached to the frame for variably changing the position of at least the optical end element essentially in a plane parallel to the viewing field of the user.

This possibility according to the invention for changing the position of the optical end element and therefore for changing the position at which the user receives the reflected-in virtual image within his viewing field offers the following advantages. On the one hand, an adaptation of this position to the individual head dimensions and to the individual eye position of the user is possible. On the other hand, the position of the virtual image can be adapted to the individual eye behavior of the user as well as to the instantaneous task-specific primary direction. The latter takes place preferably with the aid of a tracking system.

Advantageously, the optical end element is configured as a prism. This affords the advantage that the prism is half light permeable so that, on the one hand, it makes possible making the virtual image available forward of the eye of the user but, on the other hand, also does not entirely block the view of the user to the real world.

Advantageously, the deflection device (especially, a lens system contained therein) and/or the size of the prism as end element can be variably selected for the purpose of optimizing the quality and size of the virtual image.

Likewise for optimizing the quality and the size of the virtual image, it is further advantageous when the surfaces of the optical end element and/or of an optical deflecting element in the deflecting device are each configured as a prism, at least partially convex or concave curved.

The head-mounted direct visualization system according to the invention can include, in addition to a first deflecting device, also a second deflecting device having a second optical end element for deflecting a second virtual image, which is generated by a second image source, to the second optical end element. In this way, the possibility is provided for fading in a second virtual image in front of the eyes of the user. Advantageously, but not absolutely necessary, the first and second optical end elements are mounted in front of different eyes of the user. In this way, a binocular is realized which makes possible either a single view or a stereo view for the user.

When the frame for carrying the optical deflecting device is configured as a spectacles frame with spectacle lenses, which are suitable for the user, this affords the advantage that, in a simple manner, the defective vision of the user is corrected by the spectacle lenses not only when viewing the real world but also when viewing the virtual image.

An especially advantageous solution provides that the optical end element is attached to the spectacle lens, for example, with adhesive.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
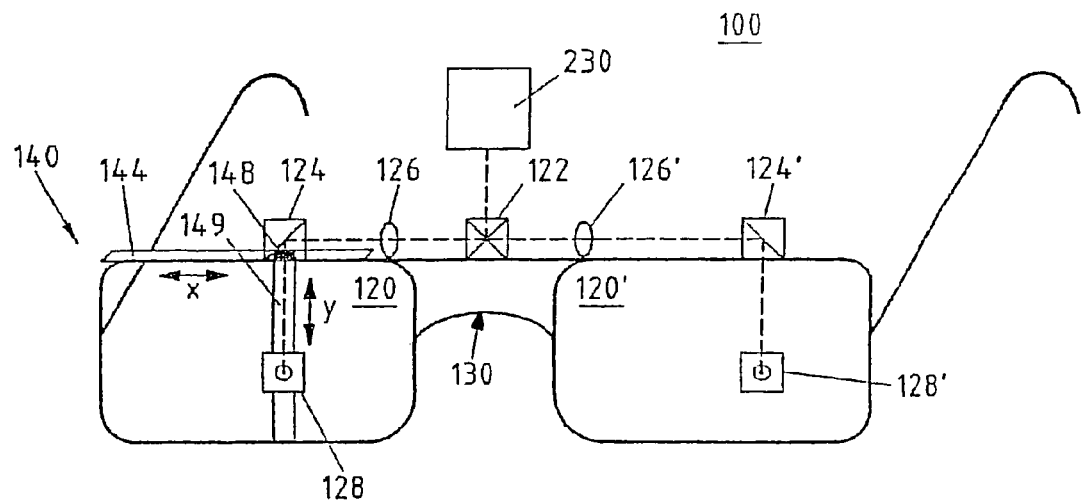
FIG. 1 shows a head-mounted optical direct visualization system in accordance with the invention; and, FIG. 2 shows a head-mounted direct visualization system according to the state of the art.
Figure 2:
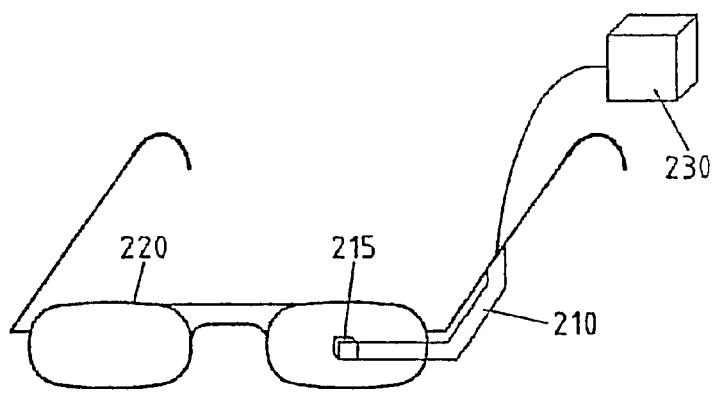

FIG. 1 shows a head-mounted optical visualization system 100 in accordance with the invention. The system includes an optical deflecting device 120 for deflecting a virtual image, which is generated by an image source 230, into the viewing field of a user. For this purpose, the deflecting device 120 preferably includes optical deflecting elements (122, 124) for deflecting the virtual image to an optical end element 128 which is likewise a component of the optical deflecting system 120. The optical deflecting elements (122, 124) are configured as prisms and the virtual image is generated by the image source 230. The virtual image exits through the optical end element 128 into the viewing field of the user ahead of the eyes of the user. The deflecting device is usually mounted on the head of the user with the aid of a frame 130. The deflecting device 120 further includes a lens or a lens system 126 for realizing an optimal image sharpness.

According to the invention, an adjusting device 140 is attached to the frame 130 for variably changing the position of at least the optical end element 128. The adjusting device 140 makes possible a change of the position of the optical end element essentially in a plane parallel to the viewing field of the user. In this way, the position of the virtual image in the viewing field of the user is, via the position of the optical end element 128, optimally adaptable to individual characteristics of the user or to task-specific viewing requirements. The position of the eyes of the user in the head is especially one of the anatomic characteristics of the user. With the task-specific viewing requirements, especially a task-specific primary viewing direction is meant. An adaptation of the position of the optical end element 128 in response to an instantaneous viewing situation of the user is, if required, made possible with the aid of a tracking system.

For adjusting the position of the optical end element 128, the adjusting device 140 includes, for example, a horizontal guide rail 144 which is attached to the frame 130. A slide 148 is movably supported in the X-direction on this guide rail 144. A guide element 149 is attached to the slide 148 on which, in turn, the optical end element 128 is supported for movement in the Y-direction. The guide element 149 can, for example, be configured as a threaded spindle. With a matched movement of slide 148 with a simultaneous suitable drive of the threaded spindle 149, the optical end element 128 can be positioned virtually as desired in a plane parallel to the viewing field of the user. It is understood that the guide rail 144 can be attached also vertically or at any desired other angle on the frame 130. The position possibilities are limited only by the length of the guide rail 144 as well as by the length of the guide element 149.

Preferably, the optical deflecting element 124 is connected fixedly to the slide 148. In this way, it is ensured that the virtual image is reflected into the optical end element 128 in every position thereof.

The described deflecting system can, together with the described adjusting device, be provided for only one eye of the viewer, that is, for monoscopic viewing. Alternatively thereto, there is, however, the possibility to make it available for both eyes of the viewer, that is, bi-ocular for simple viewing or stereo viewing. For a bi-ocular image feed, it is advantageous when the virtual image or the virtual images are fed in centrally from the image source 230 above the center bridge of the frame 130, especially above the spectacles frame. The optical lens system 126 is preferably adjustable for changing the virtual viewing depth in which the user recognizes a virtual object shown via the virtual image. Furthermore, the optical lens system 126 can also be configured to be adjustable for adjusting the size and the quality of the virtual image.

Advantageously, the optical deflecting system 120 is at least built into a closed housing outside of the viewing field of the user, that is, with respect to the optical deflecting elements (122, 124) and the lens system 126. In this way, the surfaces of the above-mentioned components are protected against contamination and the quality of the virtual image is not reduced by the incidence of external light.

Also, one or several image sources 230 can be utilized whose virtual images are distributed via two deflecting devices 120 via polarization, grating mirror or liquid crystal display (LCD shutter displays) onto the two eyes of the user.

The deflecting device 120 or at least only the optical end element 128 as well as the adjusting device 140 or at least only the guide element 149 are preferably configured releasably or tiltably on the frame 130, especially when the frame 130 is a spectacles frame. This affords the advantage that the user, when he does not need these devices any more, can easily remove these from his viewing field.

It is understood that the foregoing description is that of the preferred embodiments of the invention and that various changes and modifications may be made thereto without departing from the spirit and scope of the invention as defined in the appended claims.

What is claimed is:

1. A head-mounted optical visualization system for a user, the system comprising:
   an image source for generating a virtual image;
   an optical deflecting device including an optical end element;
   said optical deflecting device being optically connected to said image source for receiving said virtual image and for deflecting said virtual image to said optical end element whereby said virtual image is provided in the viewing field of said user in front of the eyes of said user;
   a frame mountable on the head of said user for carrying said optical deflecting system; and,
   an adjusting device attached to said frame for variably changing the two-dimensional position of said optical end element substantially in a plane parallel to said viewing field of said user.

2. The head-mounted optical visualization system of claim 1, said adjusting device including:
   a horizontal or a vertical guide rail mounted on said frame;
   a slide supported on said guide rail so as to be movable therealong; and,
   said optical end element being movably mounted on said slide.

3. The head-mounted optical visualization system of claim 1, wherein said adjusting device is configured for continuously or discontinuously changing the position of the optical end element.

4. The head-mounted optical visualization system of claim 1, wherein said optical deflecting device is adjustable with a view to a desired magnitude of said virtual image provided ahead of the eye of said user by said optical deflecting device.

5. A head-mounted optical visualization system for a user, the system comprising:
   an image source for generating a virtual image;
   an optical deflecting device including an optical end element;
   said optical deflecting device being optically connected to said image source for receiving said virtual image and for deflecting said virtual image to said optical end element whereby said virtual image is provided in the viewing field of said user in front of the eyes of said user;
   a frame mountable on the head of said user for carrying said optical deflecting system;
   an adjusting device attached to said frame for variably changing the position of said optical end element substantially in a plane parallel to said viewing field of said user; and,
   said optical end element being configured as a prism.

6. The head-mounted optical visualization system of claim 5, wherein the size of the prism can be selected.

7. The head-mounted optical visualization system of claim 6, wherein the surfaces of the prism are at least partially curved.

8. The head-mounted optical visualization system of claim 1, wherein said optical deflecting device includes an optical deflecting element for deflecting said virtual image to said optical end element.

9. A head-mounted optical visualization system for a user, the system comprising:
   an image source for generating a virtual image;
   an optical deflecting device including an optical end element;
   said optical deflecting device being optically connected to said image source for receiving said virtual image and for deflecting said virtual image to said optical end element whereby said virtual image is provided in the viewing field of said user in front of the eyes of said user;
   a frame mountable on the head of said user for carrying said optical deflecting system;
   an adjusting device attached to said frame for variably changing the position of said optical end element substantially in a plane parallel to said viewing field of said user;
   wherein said optical deflecting device includes an optical deflecting element for deflecting said virtual image to said optical end element; and,
   the optical deflecting element being configured as a prism.

10. The head-mounted optical visualization system of claim 9, wherein the surfaces of the prism are at least partially curved.

11. The head-mounted optical visualization system of claim 1, wherein said optical deflecting device includes an optical lens system which is adjustable for changing the virtual viewing depth in which said user recognizes a virtual object shown by the virtual image.

12. The head-mounted optical visualization system of claim 11, further comprising a tracking system for controlling the adjustment of said optical lens system in response to the virtual viewing direction and the real viewing depth of said user.

13. The head-mounted optical visualization system of claim 1, wherein said optical deflecting device is built into a closed housing at least outside of the viewing field of said user.

14. The head-mounted optical visualization system of claim 1, wherein said optical deflecting device is releasably attached to the frame.

15. The head-mounted optical visualization system of claim 1, wherein said image source is a first image source for generating a first virtual image; said optical deflecting device is a first optical deflecting device and said optical end element is a first optical end element; said system further comprising a second image source for generating a second virtual image; a second optical deflecting device having a second optical end element for deflecting said second virtual image to said second optical end element; and, said first and second optical end elements being mounted ahead of corresponding ones of the eyes of said user.

16. The head-mounted optical visualization system of claim 15, wherein said first image source is identical to said second image source.

17. A head-mounted optical visualization system for a user, the system comprising:
   an image source for generating a virtual image;
   an optical deflecting device including an optical end element;
   said optical deflecting device being optically connected to said image source for receiving said virtual image and for deflecting said virtual image to said optical end element whereby said virtual image is provided in the viewing field of said user in front of the eyes of said user;
   a frame mountable on the head of said user for carrying said optical deflecting system;
   an adjusting device attached to said frame for variably changing the position of said optical end element substantially in a plane parallel to said viewing field of said user;
   wherein said image source is a first image source for generating a first virtual image; said optical deflecting device is a first optical deflecting device and said optical end element is a first optical end element; said system further comprising a second image source for generating a second virtual image; a second optical deflecting device having a second optical end element for deflecting said second virtual image to said second optical end element; and, said first and second optical end elements being mounted ahead of corresponding ones of the eyes of said user; and,
   said frame being configured as a spectacles frame having spectacle lenses suitable for the user.

18. The head-mounted optical visualization system of claim 17, wherein said first and second optical end elements are mounted ahead of corresponding ones of said spectacle lenses as seen from said user.

19. A head-mounted optical visualization system for a user, the system comprising:
   an image source for generating a virtual image;
   an optical deflecting device including an optical end element;
   said optical deflecting device being optically connected to said image source for receiving said virtual image and for deflecting said virtual image to said optical end element whereby said virtual image is provided in the viewing field of said user in front of the eyes of said user;
   a frame mountable on the head of said user for carrying said optical deflecting system;
   an adjusting device attached to said frame for variably changing the position of said optical end element substantially in a plane parallel to said viewing field of said user; and,
   said optical end element being attachable to a spectacle lens.

20. A head-mounted optical visualization system for a user, the system comprising:
   an image source for generating a virtual image;
   an optical deflecting device including an optical end element;
   said optical deflecting device being optically connected to said image source for receiving said virtual image and for deflecting said virtual image to said optical end element whereby said virtual image is provided in the viewing field of said user in front of the eyes of said user;
   a frame mountable on the head of said user for carrying said optical deflecting system;
   an adjusting device attached to said frame for variably changing the two-dimensional position of said optical end element substantially in a plane parallel to said viewing field of said user;
   a vertical guide rail mounted on said frame;

a slide supported on said guide rail so as to be movable therealong; and, said optical end element being movably mounted on said slide.

21. A head-mounted optical visualization system for a user, the system comprising:

an image source for generating a virtual image;

an optical deflecting device including an optical end element;

said optical deflecting device being optically connected to said image source for receiving said virtual image and for deflecting said virtual image to said optical end element whereby said virtual image is provided in the viewing field of said user in front of the eyes of said user;

a frame mountable on the head of said user for carrying said optical deflecting system;

an adjusting device attached to said frame for variably changing the two-dimensional position of said optical end element substantially in a plane parallel to said viewing field of said user;

a horizontal and a vertical guide rail mounted on said frame;

a slide supported on said guide rail so as to be movable therealong; and, said optical end element being movably mounted on said slide.

22. The head-mounted optical visualization system of claim 11, wherein said optical lens system lies outside of said viewing field of said user.

23. The head-mounted optical visualization system of claim 13, wherein said optical deflecting device includes an optical lens system which is adjustable for changing the virtual viewing depth in which said user recognizes a virtual object shown by the virtual image; and, said optical lens system is also built into said closed housing.

24. The head-mounted optical visualization system of claim 1, wherein said optical deflecting device is tiltably attached to said frame.

25. The head-mounted optical visualization system of claim 1, wherein said optical deflecting device is tiltably attached to said frame so as to be easily displaceable out of said viewing field of said user.

* * * * *